United States Patent
Seshadri

(10) Patent No.: US 7,873,046 B1
(45) Date of Patent: Jan. 18, 2011

(54) DETECTING ANOMALOUS NETWORK ACTIVITY THROUGH TRANSFORMATION OF TERRAIN

(75) Inventor: Vijay A. Seshadri, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 784 days.

(21) Appl. No.: 11/067,583

(22) Filed: Feb. 24, 2005

(51) Int. Cl.
*H04L 12/28* (2006.01)
*H04L 12/56* (2006.01)

(52) U.S. Cl. .............. 370/392; 726/1; 726/2; 726/3; 726/11; 726/14; 726/22; 726/23; 726/24; 726/25; 713/176; 713/223; 713/224; 713/225; 714/38; 704/2; 704/9; 709/206; 709/223; 709/224; 709/225; 370/229; 370/230; 370/231; 370/233; 370/250; 370/252; 370/253; 370/389; 370/401; 370/474

(58) Field of Classification Search ............. 713/200, 713/176, 188, 189; 726/25, 1–3, 22, 23, 726/11, 14, 24; 709/223–225, 206; 370/232, 370/229–231, 233, 250, 252–253, 389, 392 370/401, 474; 714/38; 704/2, 9
See application file for complete search history.

(56) References Cited

U.S. PATENT DOCUMENTS

| 5,321,819 | A  | * | 6/1994  | Szczepanek | 709/228 |
| 6,088,804 | A  | * | 7/2000  | Hill et al. | 726/25 |
| 6,651,099 | B1 | * | 11/2003 | Dietz et al. | 709/224 |
| 6,769,066 | B1 | * | 7/2004  | Botros et al. | 726/23 |
| 7,085,231 | B1 | * | 8/2006  | Cahn | 370/232 |
| 7,134,141 | B2 | * | 11/2006 | Crosbie et al. | 726/23 |
| 7,639,714 | B2 | * | 12/2009 | Stolfo et al. | 370/474 |
| 2003/0145232 | A1 | * | 7/2003 | Poletto et al. | 713/201 |
| 2004/0025044 | A1 | * | 2/2004 | Day | 713/200 |
| 2004/0199576 | A1 | * | 10/2004 | Tan | 709/203 |
| 2005/0249214 | A1 | * | 11/2005 | Peng | 370/392 |

OTHER PUBLICATIONS

Stephen Lau, *The Spinning Cube of Potential Doom*, Lawrence Berkeley National Labs, NERSC, Dec. 10, 2003: www.nersc.gov/nusers/security/TheSpinningCube.php.

* cited by examiner

*Primary Examiner*—William R Korzuch
*Assistant Examiner*—Bryan Wright
(74) *Attorney, Agent, or Firm*—Hunton & Williams LLP

(57) ABSTRACT

Detecting anomalous network activity through transformation of a terrain is disclosed. A set of network properties is mapped into a multidimensional terrain. The terrain is transformed into an observation domain in which data events of interest are amplified relative to other data comprising the terrain. The transformed terrain is evaluated for anomalous network activity.

11 Claims, 8 Drawing Sheets

Parabolic Noise Reduction Function

DETECTING ANOMALOUS NETWORK ACTIVITY THROUGH TRANSFORMATION OF TERRAIN

FIELD OF THE INVENTION

The present invention relates generally to network security. More specifically, detecting anomalous network activity through transformation of a terrain is disclosed.

BACKGROUND OF THE INVENTION

Network intrusion detection systems (IDS) have historically relied on concepts such as signature matching, protocol analysis, and techniques with predefined thresholds such as for number of packets per time interval. A drawback of traditional signature matching is that if no signatures exist to help identify a particular threat, that threat can evade detection. Protocol analysis works by understanding how assorted protocols should work, and verifying that traffic conforms to the behavior expected of that protocol. Protocol analysis, however, requires extensive processing and knowledge of the protocols being used.

As the volume and complexity of network traffic has increased, the amount of raw network data has expanded to the point where it can be difficult to identify events of interest, e.g., network traffic anomalies that might be associated with a security threat, by applying thresholds to raw network data. Basic visualization tools have been developed as means to help administrators recognize anomalies in traffic, such as by representing different types of network traffic in different colors on a graph. However, such tools require human monitoring and human intelligence to examine a visualization to discern what traffic might pose a threat and, as in other approaches to processing raw data, they do not afford a reliable or timely way of identifying traffic anomalies such as may be associated with a security threat.

Therefore, a better way of evaluating network data for threats is needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Detecting anomalous network activity is disclosed. In one embodiment, a multi-dimensional terrain is constructed by mapping properties of a given network along each dimension to construct a terrain defined by a plurality of discrete points. In some embodiments, a noise reduction function is applied to the terrain. An amplifying transformation, such as the binary exponential takeoff transform is performed on the terrain. In some embodiments, a gradient vector along each dimension is computed. A threshold function is optionally applied to the resulting terrain. The terrain is examined for indications of anomalous network activity.

Figure 1:
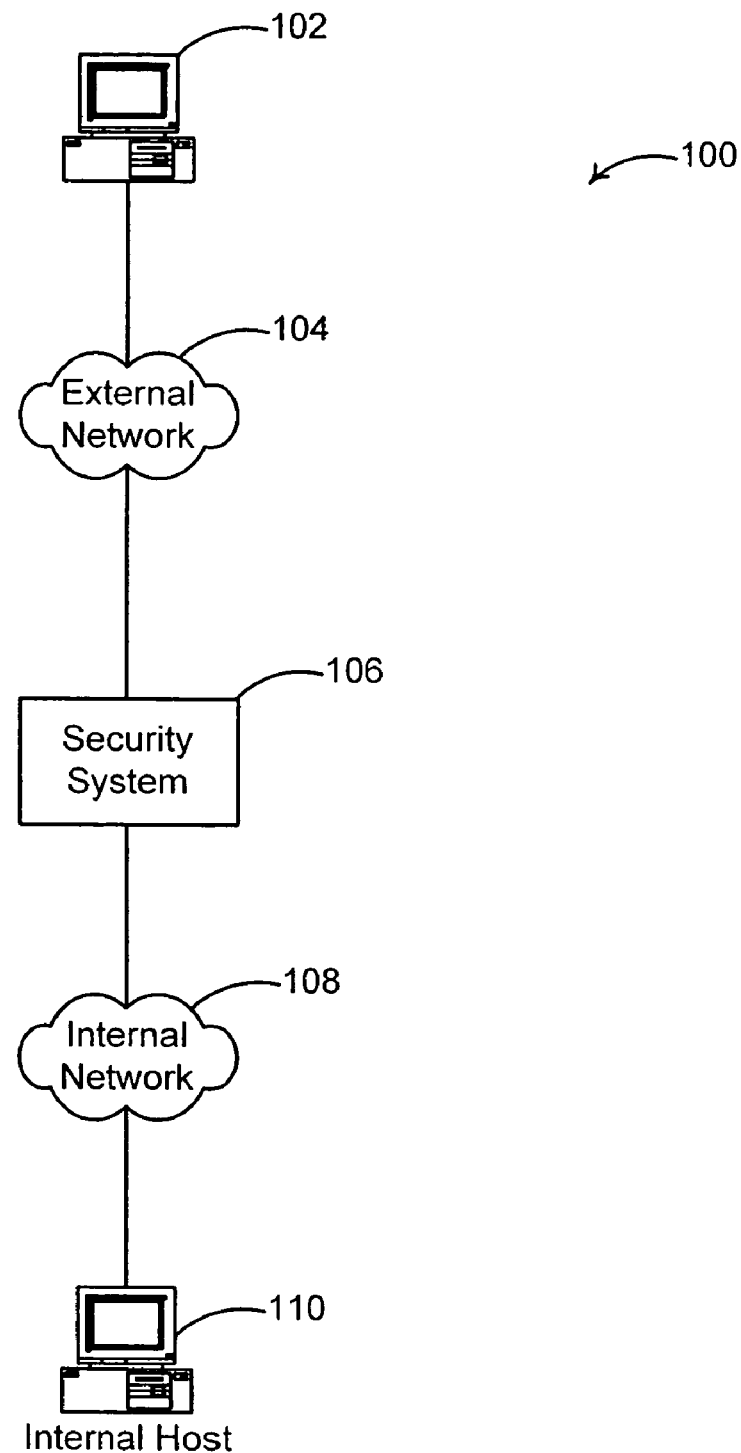
FIG. 1 illustrates an embodiment of a network environment in which security is deployed.

FIG. 1 illustrates an embodiment of a network environment in which security is deployed. The example network environment 100 illustrated includes an external host 102 configured to send data to an internal host 110 via an external network 104. Data sent by external host 102 to internal host 110 via external network 104 is processed by security system 106 and, if appropriate, delivered via internal network 108 to internal host 110. In one embodiment, security system 106 is configured to detect a security threat in data sent by external host 102 to internal host 110, such as may be present if external host 102 were compromised or otherwise posed a security risk to internal host 110. In various embodiments, security system 106 includes a firewall, NIDS, or other appropriate type of device or application for security management, intrusion detection, network security, etc., or any combination or plurality of such devices or applications. In one embodiment, security system 106 includes a firewall. In one embodiment, security system 106 includes an IDS or other security device inline. In one embodiment, security system 106 includes an IDS or another security device configured to receive a copy of network traffic. While in the example shown in FIG. 1 a single external host 102 and a single internal host 110 are shown, in a typical environment there may be a plurality of external hosts connected to external network 104 and a plurality of internal hosts associated with internal network 108.

Figure 2A:
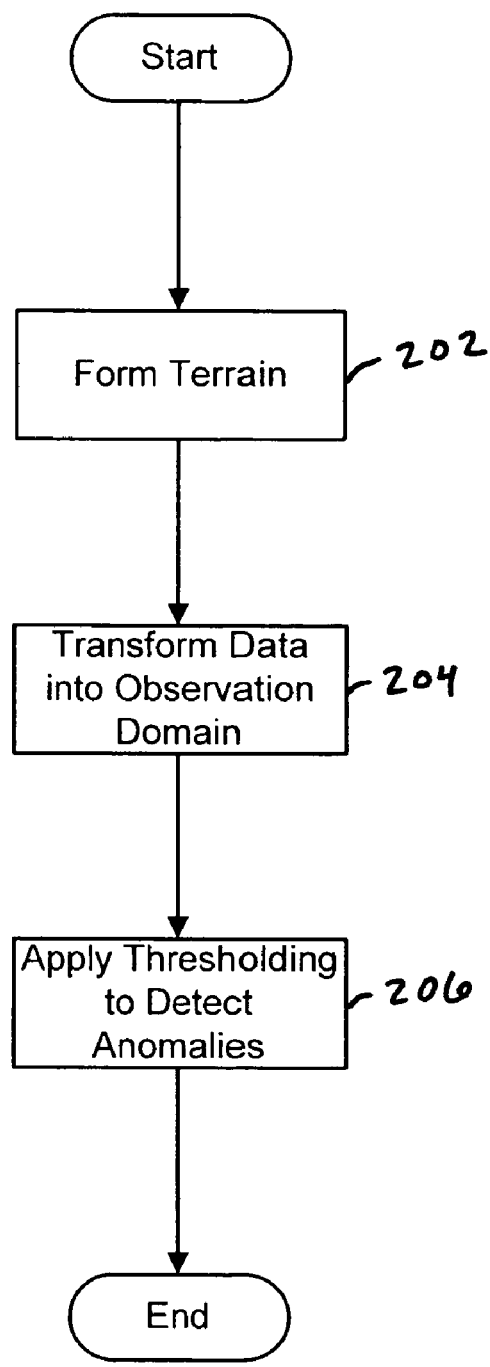
FIG. 2A illustrates an embodiment of a process for monitoring network traffic for threats.

FIG. 2A illustrates an embodiment of a process for monitoring network traffic for threats. In some embodiments, the process of FIG. 2A is implemented in a security system, such as security system 106. In some embodiments, the process of FIG. 2A is implemented in a network intrusion detection system (IDS), where network data as seen by the IDS can be stored and analyzed, and anomalous network patterns detected by the IDS are reported to an administrator or another device.

Security system 106 potentially examines significant amounts of network traffic each day. Data about that traffic can be accumulated. Such data can include a wide variety of statistical information about virtually any network property, including the number of connections from or to a particular IP address or port, the protocol used, the number of packets seen, etc.

At 202 of the process of FIG. 2A, a network terrain is constructed based at least in part on one or more observed or received network parameters. In 204, the terrain is transformed into an observation domain. In some embodiments, the transformation is such that events potentially of interest from a network security standpoint, e.g., deviations from normal or expected network traffic, are highlighted. At 206, one or more thresholds are applied to the transformed terrain to detect anomalies.

A multidimensional network terrain ($T_t$) can be constructed from a set of network parameters and a magnitude as follows:

$$\text{Network Terrain } T_t: P_1 \times P_2 \times P_3 \times \ldots \times P_n \rightarrow M, \text{ with} \quad (1)$$

$$\text{Network Parameter Space } P_s = \{P_1, P_2, P_3 \ldots P_n\} \text{ where } P_i \subseteq Z \text{ and} \quad (2)$$

$$\text{Magnitude } M: M \subseteq Z. \quad (3)$$

For example, by plotting for each of a universe of IP address/TCP port pairs of interest (e.g., destinations on a protected network, the number of packets seen going to that IP address and TCP port), a 3-dimensional network terrain can be constructed with IP address and TCP port as the X and Y axes, respectively. In this example, the magnitude (Z-axis) is the number of packets seen. In other examples, other values such as number of bytes could be used as the magnitude. In some embodiments, a parameter or value other than a measure of traffic magnitude or volume may be plotted on the Z-axis. In some embodiments, a terrain comprising four or more dimensions may be constructed.

In some embodiments, 202 includes forming a differential domain calculated from the state of a network terrain at two points in time. An update interval $T_U$ can be defined as the time elapsed between any two successive terrain computations. Thus, $T_U = t_2 - t_1$ where $T_1$ is the network terrain at time $t_1$ and $T_2$ is the network terrain at time $t_2$. A differential domain $T_D$ can be computed by applying the following formula, where m and p are the number of discrete points along the X and Y axes respectively:

$$V_{i=1\ldots m} V_{j=1\ldots p} T_D(x_i, y_j) = T_2(x_i, y_j) - T_1(x_i, y_j) \quad (4)$$

In some embodiments 204 includes transforming a differential domain, such as described above, into an observation domain. A given terrain can be considered as a vector space. An "interesting" network pattern can be defined as alignment of vectors along any axis, including the magnitude axis, or along multiple axes. For example, if the same destination port is being scanned across many different IP addresses, a worm scan may be indicated. If a large amount of traffic is seen being sent to one IP address, on many ports, that could indicate a port scan. Network patterns that are interesting from a network security standpoint typically will occur when the slope is positive, rather than negative, so in some embodiments the differential domain $T_D$ is modified as part of the transformation performed at 204 to nullify negative transitions in magnitude, as described more fully below. In some embodiments, negative values of $T_D$ are instead nullified in 202 by setting $T_D$ to zero if $T_D$ as calculated, using equation (4) for example, is negative.

If the vectors aligned along one axis are amplified exponentially, interesting network patterns can become more readily identifiable. This can be especially important in network environments, such as web server farms, in which a great deal of network traffic crosses port 80, but virtually no other traffic should exist. Detecting patterns of interest in such a context, in which patterns of interest may be buried in a high volume of potentially widely fluctuating legitimate traffic, can present a particular challenge and result in patterns of interest being missed and/or security systems, processes, and/or personnel being overwhelmed by false positives. In some embodiments, the transformation performed at 204 is a binary exponential takeoff (BET). Other transforms that similarly highlight interesting patterns, such as activity along an axis, could be used as appropriate.

In some embodiments, a transformation function is performed along each axis. Beginning with the X-axis, for any given row i=n, where i=1 . . . m, $T_D$ values are recomputed according to the following formula:

$$T_D(x_n, y_j) = T_D(x_n, y_j) * 2^{index} \text{ where } j = 1 \ldots p \quad (5)$$

Here, index is incremented every time a non-zero $T_D$ value is encountered.

By performing this transformation, vectors that lie along the X-axis are exponentially amplified. A combination of functions can be applied for each axis, ensuring that vectors aligned with each axis are amplified, and providing further amplification from different dimensions of a given mound in the terrain. Thus, a Gaussian mount would be amplified from each dimension in which it participates. This can be particularly useful in detecting denial of service attacks, where alignments are likely to occur along multiple axes.

In this example, using the modified terrain $T_D$, i.e., the partially modified terrain as it exists after the equation (5) has been applied to the original differential terrain along the X-axis, the same operation is performed for each column j=r, where j=1 . . . p, according to the following formula:

$$T_D(x_i, y_r) = T_D(x_i, y_r) * 2^{index} \text{ where } i = 1 \ldots m \quad (6)$$

Here, index is again incremented any time a non-zero $T_D$ value is encountered. In some embodiments, index is reset to zero prior to beginning transformation calculations along a new axis.

Figure 2B:
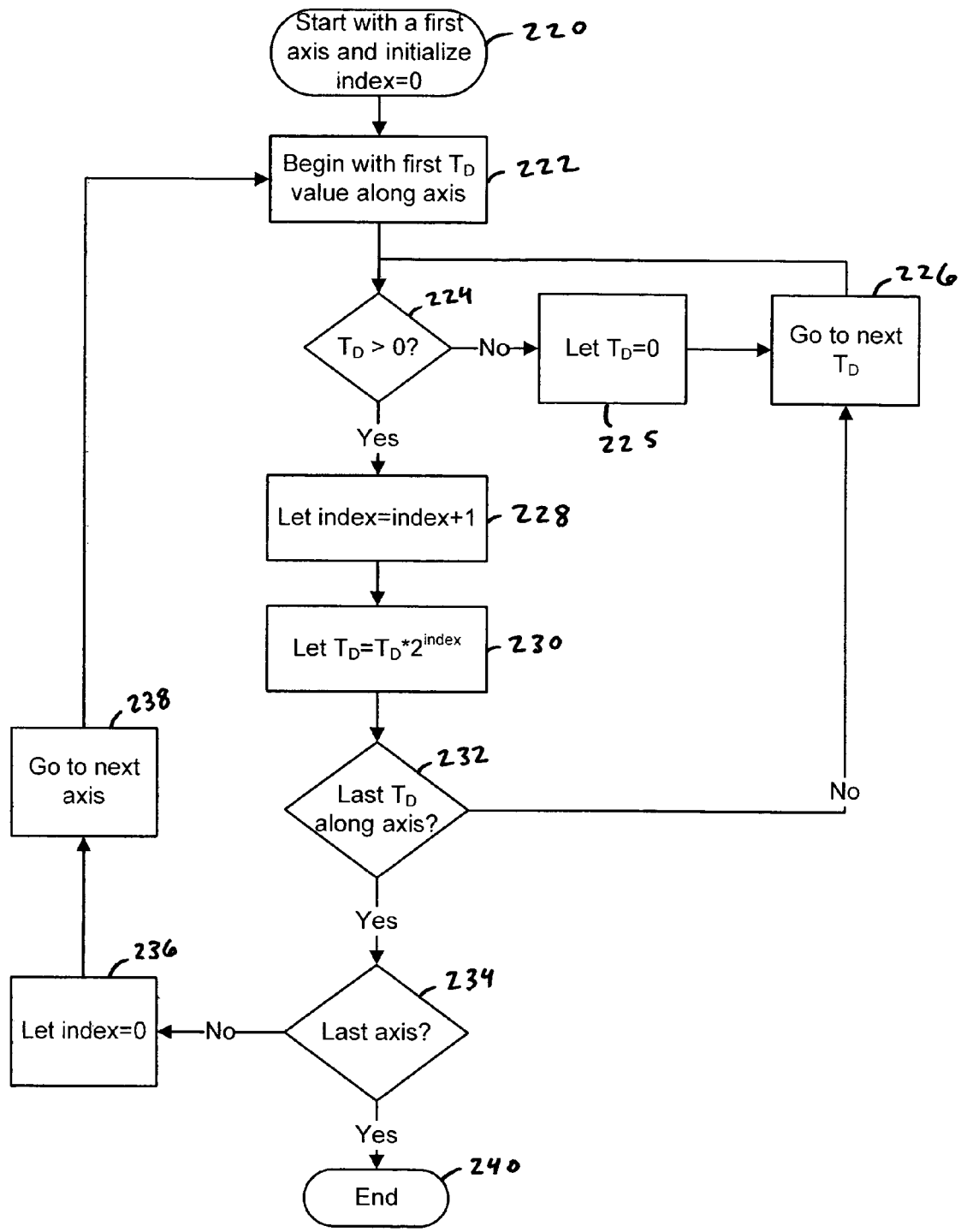
FIG. 2B illustrates an embodiment of a process for applying a BET transform to a network terrain.

FIG. 2B illustrates an embodiment of a process for applying a BET transform to a network terrain. In some embodiments, the process of FIG. 2B is used to apply the transform described above in connection with equations (5) and (6). The transformation begins with a first axis and the counter index initialized as equal to zero (220). Starting with the first $T_D$ value encountered along the axis being processed (222), it is determined whether $T_D$ is greater than zero (224). If not, $T_D$ is set to zero at 225 (to nullify any negative values in the differential domain) and processing advances at 226 to the next $T_D$ value along the axis currently being processed. If $T_D$ is greater than zero, at 230 the counter index is incremented by one and a new value $T_D = T_D * 2^{index}$ is calculated, as in equations (5) and (6) above. If the most recently processed value of $T_D$ is not the last $T_D$ value to be processed on the axis currently being processed (232), processing advances to the next $T_D$ value along the axis currently being processed (226). If the most recently processed value of $T_D$ is not the last $T_D$ value to be processed on the axis currently being processed (232), it is determined whether the axis for which processing was just completed is the last axis to be processed (234). If not, the counter index is reset to zero (236) and processing continues with the next axis to be processed (238). Once the transformation calculation has been processed along each axis to be processed (234) the process of FIG. 2B ends (240). In some embodiments, the processing of FIG. 2B is performed along every axis of the network terrain on which activity potentially of interest is desired to be highlighted and/or detected. For example, in a three dimensional terrain in which destination IP address is plotted along the X-axis, destination port plotted along the Y-axis, and some measure of network traffic (e.g., number of packets, number of bytes, etc.) along the Z-axis, the process of FIG. 2B would be applied along the X and Y axes in order to detect events of interest with respect to network traffic flow as viewed by destination IF address and port.

Activities such as port scans and worm scans will tend to stand out on a network terrain transformed as described herein since they tend to have activity specific to a single IP address or TCP port, or combination thereof. However, since the process of FIG. 2A does not depend on any particular network data, the applications for this process are broader than detecting worms and port scans.

In some embodiments, at 206, a gradient vector is computed for each dimension in the network terrain. This allows for the consolidation of amplified network patterns into one vector so that a thresholding function can be applied. For each dimension d, a gradient vector $G_d$ can be computed for each discrete point along that dimension for which data exists that sums all of the values of terrain $T_D$ along at least one other dimension of interest, such as by applying the following formula to calculate a column-wise gradient vector for each discrete X-axis location n for which data exists:

$$G_1(n) = \sum_{j=1...p} T_D(x_n, y_j) \quad (7)$$

In this example, a column-wise sum is computed for the X-axis and a row-wise sum is computed for the Y-axis. In some embodiments, a threshold is applied to the gradient vector(s), e.g., as calculated in equation (7), and responsive action taken if the magnitude of any gradient vector exceeds the threshold. In some embodiments, calculation of the gradient vector further amplifies anomalous activity aligned along one or more axis, e.g., a spike in traffic for a given port across IP addresses (potential worm scan) or across ports for a given IP address (potential port scan), such that even a rough threshold may be used to identify activity of interest with high reliability and few false positive results. Computation of a gradient vector may not be necessary to detect certain kinds of patterns, such as those related to a denial of service attack, in which case thresholding functions can be directly applied to the transformed terrain $T_D$.

In some embodiments, a graphical user interface can be configured to display graphical representations of transformed terrains to a user. In some embodiments, digital image processing techniques are employed. For example, a 3 dimensional terrain could be transformed as described above and the transformed terrain rendered as an image, where the Z-axis becomes pixel depth or intensity. In that case, anomalies may be shown, for example, as patches of brightness. In that case, the thresholding applied may be the judgment of a user viewing the graphical representation. In some embodiments, the thresholding is performed automatically, e.g., based on numerical representations of pixel depth or intensity, by a processor, such as may be part of security system 106.

Figure 3:
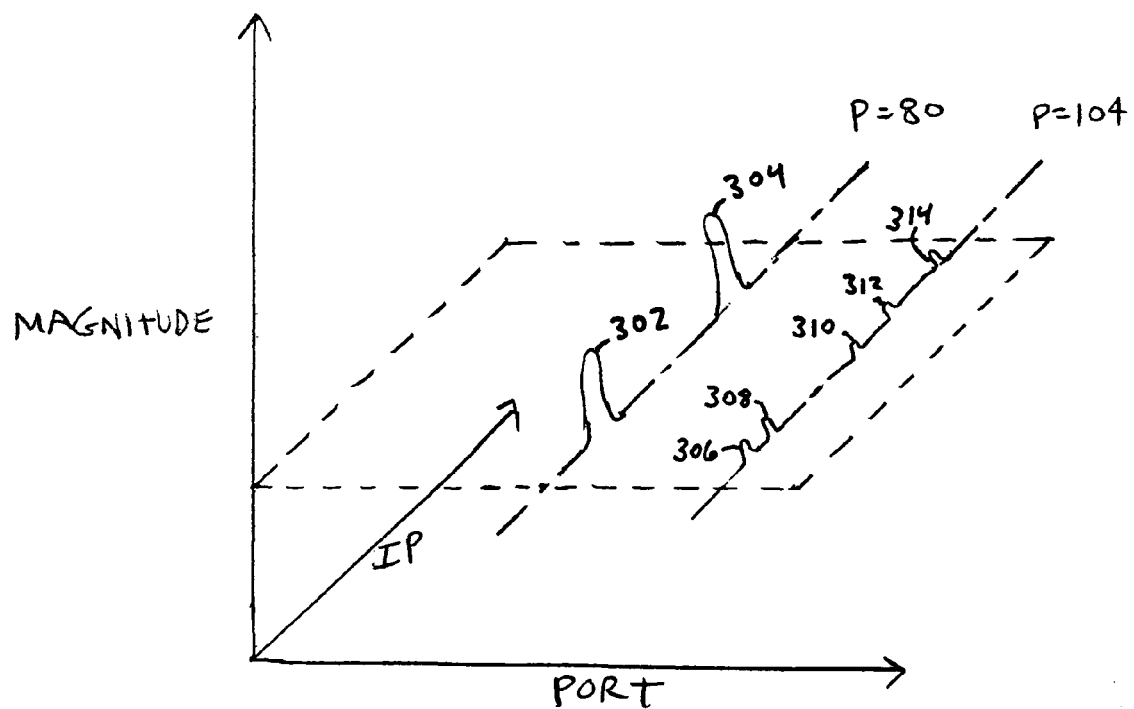
FIG. 3 illustrates transformation of a differential domain into an observation domain according to an embodiment.
Figure 3:
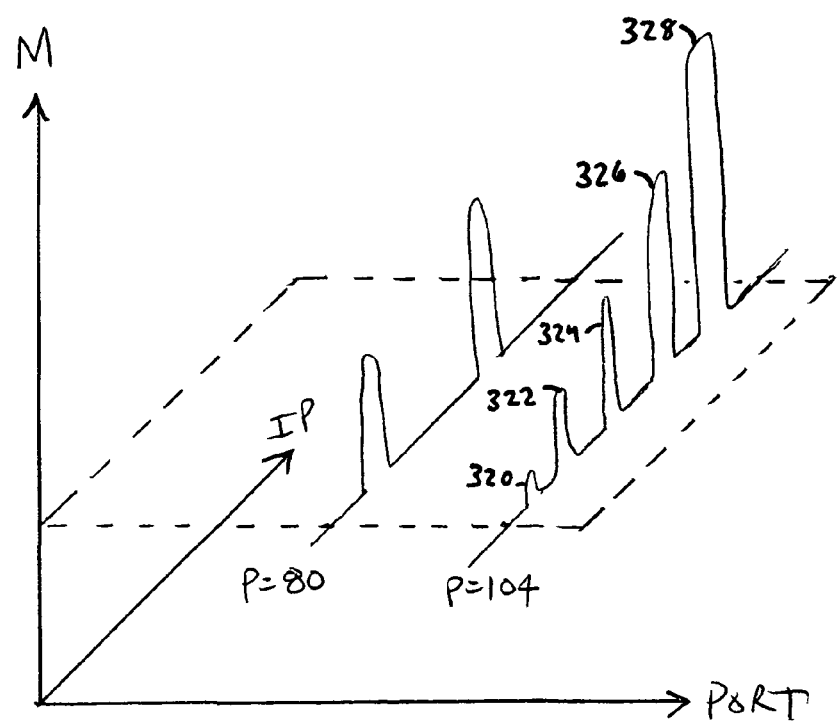

FIG. 3 illustrates transformation of a differential domain into an observation domain according to an embodiment. In the example illustrated, in the top graph, a differential domain has been formed by calculating and plotting the increase, if any, in the number of packets (Z-axis) observed to (or from) a given IP address (X-axis) and a TCP port (Y-axis) between a first observation period $T_1$ and a second observation period $T_2$ (i.e., $T_d = T_2 - T_1$), such as at 202 of FIG. 2A. In the example shown, negative values for $T_d$ have been nullified (i.e., set to equal zero) prior to the transform being applied. In the bottom graph, the data has been transformed into an observation domain such as at 204 of FIG. 2A, e.g., by application of the process of FIG. 2B.

In the example shown in FIG. 3, two hosts have experienced a significant increase in the amount of web traffic they are transmitting (or receiving), as represented in the top graph by the two spikes at 302 and 304. Five hosts have experienced a smaller (in terms of magnitude on each host) increase in the amount of traffic they were transmitting (or receiving) on TCP port 104, as represented by the small bumps at 306, 308, 310, 312, and 314 in the top graph.

As illustrated in the top graph, it is possible that the traffic on TCP port 104 might go unnoticed due to the relatively small magnitude of the bumps. The differential domain depicted in the top graph can be transformed into an observation domain, such as by the process at 204 in FIG. 2A. The resulting terrain, depicted in the bottom graph, illustrates how significantly the BET transformation enhances the anomalous traffic. As depicted in the bottom graph, the traffic seen along TCP port 104 at 320, 322, 324, 326, and 328 is now readily apparent. The activity on port 104 would be amplified even further, and hence more easily detected and distinguished by the possibly harmless activity on port 80, by calculating a gradient vector as described above. A gradient vector calculated for port 104, for example, would further amplify the already enhanced peaks 320-328 of the BET transformed terrain shown in the lower graph of FIG. 3, making it that much easier to detect the activity across hosts on port 104 by automatically applying a threshold. Because the difference between the activity on port 104 and the activity on port 80, which is assumed in this example to be innocent (e.g., due a short term increase in interest in legitimate increase in http content available from the affected hosts) would be greatly amplified, even a rough threshold could be used to identify the activity on port 104 as being of interest (or at least of greater or more immediate interest or urgency than the activity on port 80).

In general, if N network parameters are selected, a terrain with N+1 dimensions can be formed. Thus, the process of FIG. 2A is not limited to 3 dimensions, nor must it always include IP address and TCP port.

For example, unused IP protocol codes can be used as backdoors and potentially as a DDOS communication channel. A 4 dimensional network terrain can be parameterized with source IP, destination IP, and IP protocol. Suppose, for example, that an unused IP protocol code, such as "11," appears in the network. A streak of activity along the IP protocol code axis for code 11 across a variety of IP addresses might be seen. Other interesting patterns such as a sudden surge of ICMP traffic between two hosts could also be detected. In some embodiments, rather than operating at the transport layer, the process of FIG. 2A is implemented to monitor other network layers, such as the application layer.

A 4 dimensional terrain can also be used to detect worm propagation. For example, in a typical worm propagation scenario, a worm can infect multiple hosts through the use of a single compromised node. In one embodiment, a 4 dimensional network terrain is parameterized with source IP, destination IP, and TCP port. Worm propagation can be detected by observing that vectors are aligned along the source IP axis, even if they are not directed to the same ports.

Figure 4A:
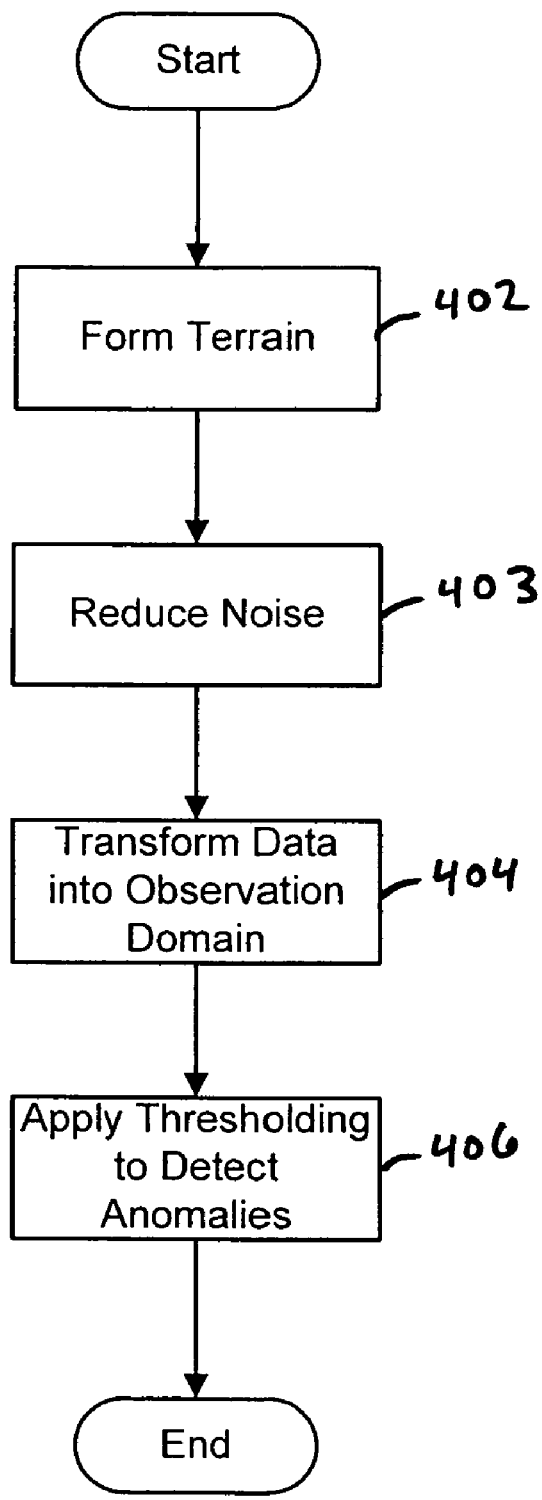
FIG. 4A illustrates an embodiment of a process for monitoring network traffic for threats.

FIG. 4A illustrates an embodiment of a process for monitoring network traffic for threats. In the example illustrated, normal and/or expected changes of traffic are removed from consideration and only those changes that deviate meaningfully from normal and/or expected behavior are processed. In some embodiments, 402, 404, and 406 of FIG. 4 correspond to 202, 204, and 206, respectively, of FIG. 2. At 403, an effort is made to remove from consideration normal and/or expected changes in network traffic, which are considered "noise" in embodiments in which an effort is being made to detect network security events by detecting deviations from normal and/or expected behavior. In some embodiments, 403 includes calculating and applying a noise reduction function.

When a rise in network traffic activity is detected, it is possible that the increase is due to normal fluctuations in the usage of the network. For example, on most Monday mornings, a significant rise in network traffic activity is likely to be seen due to the legitimate login activities of employees. Such normal activity will be falsely flagged as an interesting anomaly if no effort is made to remove such normal fluctuations in activity from consideration, i.e., to reduce the noise.

Moreover, if a bona fide threat coincides with an expected traffic spike, it may escape detection if some form of noise reduction is not employed. Absent noise reduction, worm propagation occurring on a Monday morning may go unnoticed. Thus, while it isn't necessary, including optional noise reduction into the process of FIG. 2A may improve the accuracy of the anomaly detection.

One way of providing noise reduction is through the use of a $T_D$ data store. An interval $T_S$ can be defined as a time interval over which averaged network terrains are stored for noise reduction purposes. For each $T_S$, the mean and standard deviation of each $T_D$ at that time can be computed and stored. For example, if $T_S$ is an hour, then every hour, the mean and standard deviation of $T_D$ is computed. In this example, a week's worth of information is stored in the $T_D$ data store. In other examples, other periods may be used. For example, if space requirements permit, a year's worth of information may comprise the $T_D$ data store. In some embodiments, a mixed data store is created, for example comprising one set of data for a workweek, and another set of data for events such as holiday weekends.

To provide noise reduction on current network activity, a parabolic function can be created that computes new values of $T_D(x_i,y_j)$ based on the mean and standard deviation of $T_D$ over the corresponding $T_S$ interval. If $\mu_d$ is the mean $T_D$ over the previous $T_S$ interval (e.g., the last Monday morning from 9 am to 10 am, if weekly data taken at hour intervals is used, or the last July 4, if annual data is used) and $\sigma_d$ is the standard deviation of $T_D$ over the previous $T_S$ interval, a noise reduction function can be defined as follows:

$$N_R(x_i, y_j) = \frac{(T_D(x_i, y_j) - \mu_d)^2}{\sigma_d^2} \quad (8)$$

where $\sigma_d > 0$ and $$N_R(x_i,y_j)=(T_D(x_i,y_j)-\mu_d)^2 \text{ where } \sigma_d=0. \quad (9)$$

Figure 4B:
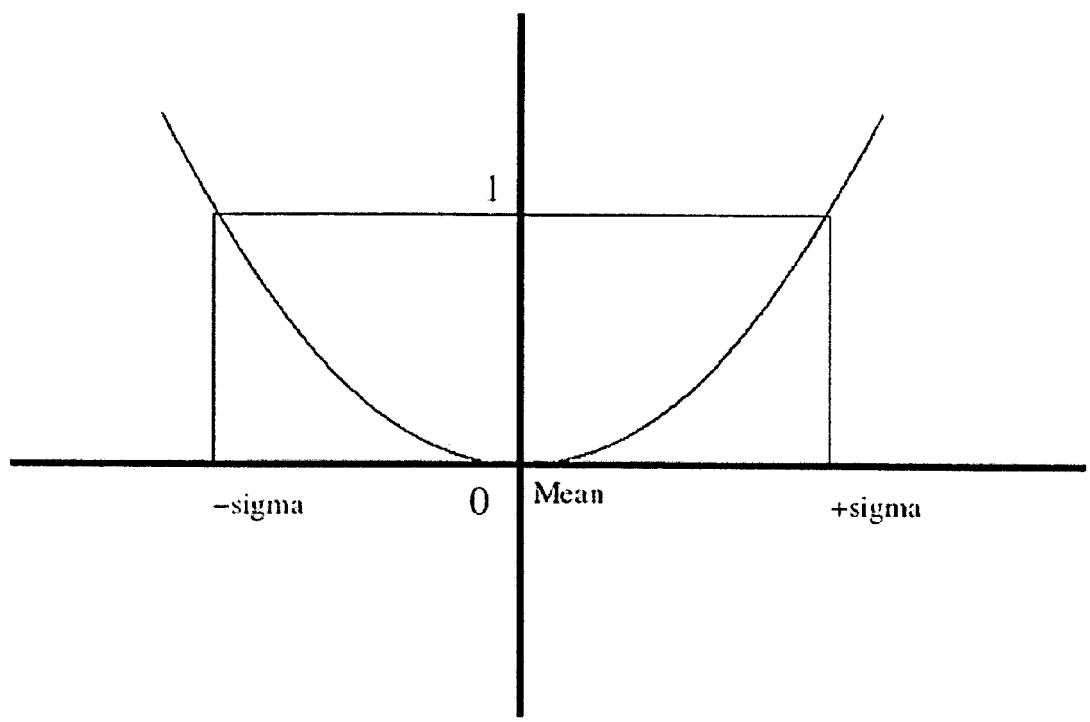
FIG. 4B illustrates an example of a parabolic noise reduction function.

FIG. 4B illustrates an example of a parabolic noise reduction function. In the example illustrated, a parabola is fitted for each given standard deviation. The parabolic function defines a multiplication factor. When the difference from the mean is 0, the noise reduced value is 0. When the difference from the mean matches the standard deviation, the multiplication factor is 1. For values between 0 and the standard deviation, a multiplication factor between 0 and 1 is applied based on the slope of the parabola. When the difference from the mean exceeds standard deviation, the multiplication factor rises exponentially.

The higher the standard the deviation and lower the slope of the parabola, the higher the tolerance for deviation from the norm will be. The lower the standard deviation and higher the slope of the parabola, the lower the tolerance for deviation from the norm will be.

In some embodiments, a noise reduction multiplication factor, as described above in connection with equations (8) and (9) and illustrated in FIG. 4B, is applied at 403 to a differential terrain formed at 402 by multiplying each value comprising the differential terrain by its corresponding noise reduction factor (e.g., calculated using equations (8) and (9)) to obtain a noise-reduced differential terrain which is transformed into an observation domain at 404 prior to applying one or more threshold automatically at 406.

Figure 5A:
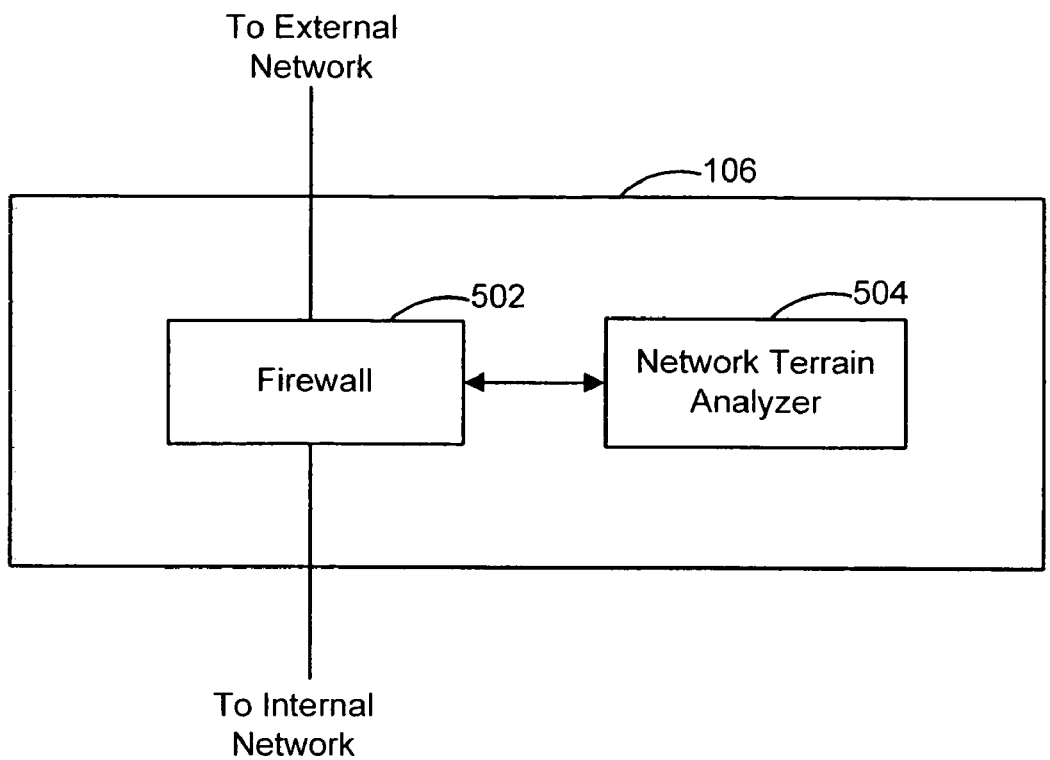
FIG. 5A illustrates an embodiment of a security system configured to monitor network traffic for threats.

FIG. 5A illustrates an embodiment of a security system configured to monitor network traffic for threats. In the example shown, the security system 106 of FIG. 1 includes a firewall 502 configured to send and receive network to/from external network 104 and internal network 108 as appropriate, e.g., to the extent permitted by the policies the firewall 502 is configured to enforce. In the example shown, the firewall 502 is configured to provide to a network terrain analyzer 504 included in security system 106 network traffic statistics at least a subset of which the network terrain analyzer 504 is configured to analyze for network traffic anomalies as described herein.

Figure 5B:
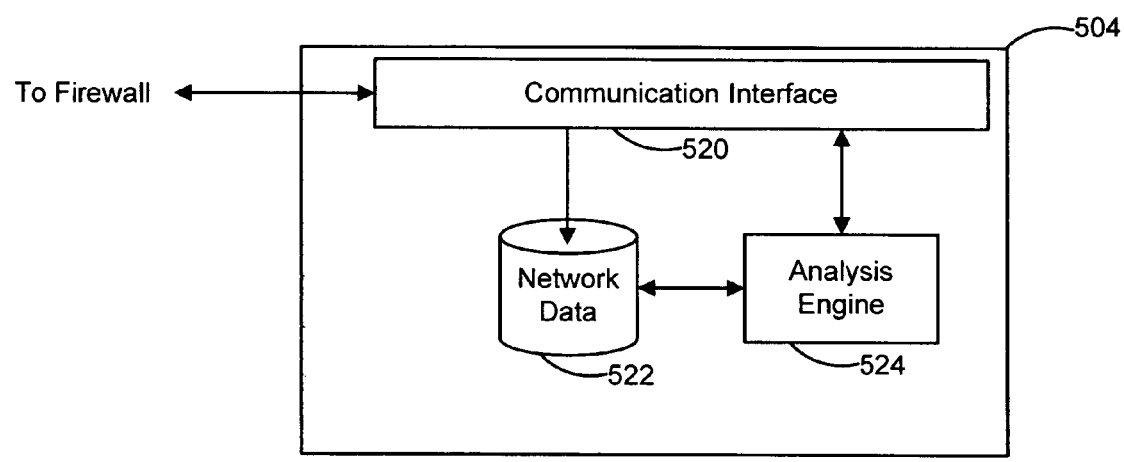
FIG. 5B illustrates an embodiment of a network terrain analyzer.

FIG. 5B illustrates an embodiment of a network terrain analyzer. In the example shown, the network terrain analyzer 504 of FIG. 5A includes a communication interface 520 configured to receive network traffic data (e.g., statistics) from firewall 502. In other embodiments, the network traffic data may be received from some other source. In some embodiments, the data received includes NetFlow™ data. Data received at communication interface 520 is stored in a network traffic database 522. An analysis engine 524 is configured to read (or receive) network traffic data from database 522 and apply network terrain analysis as described herein to detect anomalies in network traffic behavior, such as may be associated with a network security event, such as a port scan, worm scan, denial of service attack, or other security event. In the example shown, the analysis engine is configured to store data, such as transformed network terrain data, in database 522 and to communicate with external hosts via communication interface 520, for example to send an alert in the event anomalous network traffic is detected. In some embodiments, analysis engine 524 may be implemented using a special or general purpose processor, an ASIC, a programmable logic device, firmware, software, and/or any other structure or combination of structures capable of being configured to perform the processing described herein.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for detecting anomalous network activity comprising: mapping, using at least one computer processor, a set of network properties into a multidimensional terrain by comparing a first set of values for the set of network properties as observed during a first period with a second set of values for the set of network properties as observed during a second period and constructing a differential terrain representing the difference between the second set of values and the first set of values; transforming the differential terrain into an observation domain in which data events of interest are amplified relative to other data comprising the differential terrain by applying to the differential terrain a binary exponential takeoff transform that exponentially amplifies data events aligned along an axis of the differential terrain; and evaluating the transformed terrain for anomalous network activity by computing a gradient vector along each dimension of the transformed terrain and applying to each gradient vector an associated threshold.

2. The method as recited in claim 1, further comprising nullifying negative differences between the second set of values and the first set of values.

3. The method as recited in claim 1, wherein constructing a differential terrain representing the difference between the second set of values and the first set of values includes subtracting from each of a plurality of discrete data points comprising the second set of values one or more corresponding values from the first set of values.

4. The method as recited in claim 1, wherein evaluating the transformed terrain for anomalous network activity includes applying a threshold to the transformed terrain.

5. The method as recited in claim 1, further comprising applying noise reduction to the differential terrain.

6. The method as recited in claim 5 wherein the noise reduction applied is based on historical data.

7. The method as recited in claim 5 wherein applying noise reduction includes applying a parabolic noise reduction function to the differential terrain.

8. A system configured to detect anomalous network activity, comprising: a communication interface configured to receive network transmission data comprising data associated with a set of network properties; and at least one computer processor configured to: map the set of network properties into a multi-dimensional terrain by comparing a first set of values for the set of network properties as observed during a first period with a second set of values for the set of network properties as observed during a second period and constructing a differential terrain representing the difference between the second set of values and the first set of values; transform the differential terrain into an observation domain in which data events of interest are amplified relative to other data comprising the differential terrain by applying to the differential terrain a binary exponential takeoff transform that exponentially amplifies data events aligned along an axis of the differential terrain; and evaluate the transformed terrain for anomalous network activity by computing a gradient vector along each dimension of the transformed terrain and applying to each gradient vector an associated threshold.

9. The system as recited in claim 8, wherein the processor is further configured to apply noise reduction to the differential terrain.

10. A computer program product for detecting anomalous network activity, the computer program product comprising a non-transitory computer readable storage medium having computer instructions encoded thereon which when executed by a processor cause the processor to perform the steps of:

mapping a set of network properties into a multidimensional terrain by comparing a first set of values for the set of network properties as observed during a first period with a second set of values for the set of network properties as observed during a second period and constructing a differential terrain representing the difference between the second set of values and the first set of values;

transforming the differential terrain into an observation domain in which data events of interest are amplified relative to other data comprising the differential terrain by applying to the differential terrain a binary exponential takeoff transform that exponentially amplifies data events aligned along an axis of the differential terrain; and evaluating the transformed terrain for anomalous network activity by computing a gradient vector along each dimension of the transformed terrain and applying to each gradient vector an associated threshold wherein the non-transitory computer readable storage medium does not include transitory signals.

11. The computer program product as recited in claim 10, the computer program product further comprising computer instructions for applying noise reduction to the differential terrain.

* * * * *